(No Model.)

C. MASCHMEYER.
BICYCLE LAMP.

No. 590,044. Patented Sept. 14, 1897.

UNITED STATES PATENT OFFICE.

CHARLES MASCHMEYER, OF MERIDEN, CONNECTICUT, ASSIGNOR TO THE EDWARD MILLER & COMPANY, OF SAME PLACE.

BICYCLE-LAMP.

SPECIFICATION forming part of Letters Patent No. 590,044, dated September 14, 1897.

Application filed May 4, 1896. Serial No. 590,091. (No model.)

*To all whom it may concern:*

Be it known that I, CHARLES MASCHMEYER, of Meriden, in the county of New Haven and State of Connecticut, have invented a new Improvement in Bicycle-Lamps; and I do hereby declare the following, when taken in connection with the accompanying drawings and the letters of reference marked thereon, to be a full, clear, and exact description of the same, and which said drawings constitute part of this specification, and represent, in—

Figure 1:
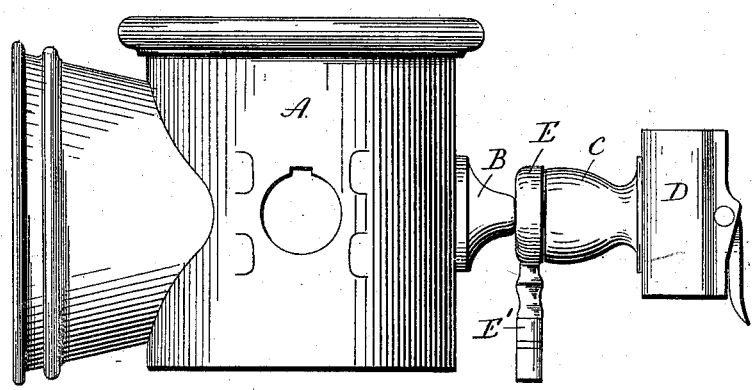
Figure 3:
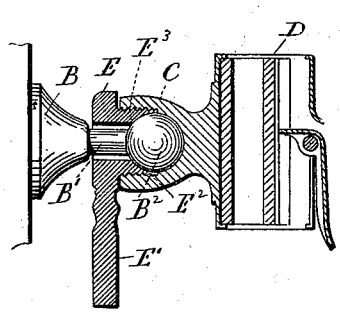
Figure 2:
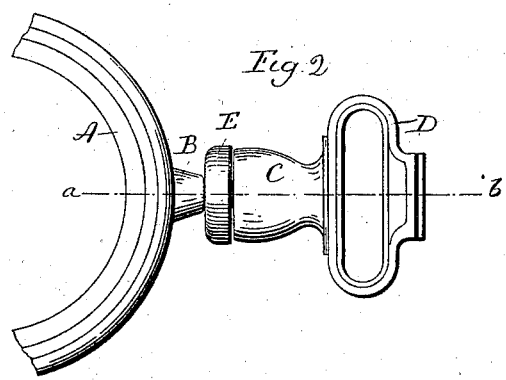

Figure 1, a view in side elevation of a lamp and clip adjustably connected in accordance with my invention; Fig. 2, a broken plan view thereof; Fig. 3, a sectional view on the line $a\ b$ of Fig. 2.

My invention relates to an improvement in bicycle-lamps, the object being to provide for adjusting them vertically and laterally, so as to throw the light upward or downward or on either side, according to the circumstances under which the light is being used.

With these ends in view my invention consists in certain details of construction, as will be hereinafter described, and pointed out in the claim.

In carrying out my invention as shown in the drawings the body A of the lamp, which may be of any approved construction, is provided with a rigidly-attached stem extending rearward in line with the horizontal axis of the said body, comprising a foot B, a shank B′, and a ball $B^2$, the latter constituting the ball member of a ball-and-socket joint and adapted to be set into and received by a forwardly-extending forwardly-opening socket C, forming the socket member of a ball-and-socket joint and rigidly secured to the clip D, which may be of any approved construction and which provides for the removable attachment of the lamp to a bicycle-frame.

For the purpose of binding the ball $B^2$ in any desired position in the socket C, I employ a clamp consisting of a ring E, furnished, as shown, with a handle E′ and with a rearwardly-projecting externally-threaded hub $E^2$, the threads of which take into internal threads formed within the outer end of the socket C. The inner end of the said sleeve is circularly recessed, as at $E^3$, to conform to the curvature of the ball $B^2$, which it grips when the handle E′ is turned, so as to move the sleeve inward upon the ball. The ring E, before mentioned, surrounds the shank B′ of the stem and is interposed between the foot B of the stem and the ball $B^2$, which retains the clamp upon the stem, whereby it is guarded against loss and kept in readiness for use.

It will be readily understood that by means of its handle E′ the clamp may be turned so as to relieve its grip upon the ball, after which the lamp may be adjusted vertically or laterally, as required, and then fixed in its adjusted position by manipulating the clamp so as to grip the ball and force it into the bottom of its seat in the socket. The construction described is very simple in itself, capable of easy and rapid manipulation, and is also very effective in supporting the lamp in any desired position against the jarring of the machine.

I do not, however, broadly claim a ball-and-socket joint between the body of a bicycle-lamp and a clip employed for securing the lamp to a bicycle-frame, that construction, broadly speaking, being old.

Having fully described my invention, what I claim as new, and desire to secure by Letters Patent, is—

The combination with a lamp-body, of a stem rigidly secured thereto, extending rearwardly therefrom in line with the horizontal axis thereof, and terminating at its rear end in a ball; a clip adapted to be applied to a bicycle-frame; a forwardly-opening, internally-threaded socket, rigidly connected with the clip, extending horizontally forward therefrom, and adapted to receive the said ball; and a clamp consisting of a ring loosely mounted upon the said stem and retained thereon by the said ball, an externally-threaded hub extending rearward from the said ring with which it is concentric, adapted to be entered into and received by the said socket and recessed at its end to engage with the ball which it forces into the bottom of the socket, and a laterally-extending handle connected with the ring for operating it, substantially as described.

In testimony whereof I have signed this specification in the presence of two subscribing witnesses.

CHARLES MASCHMEYER.

Witnesses:
I. B. MILLER,
L. W. STAETTMILLER.